(12) United States Patent
Matsuoka et al.

(10) Patent No.: US 10,677,347 B2
(45) Date of Patent: Jun. 9, 2020

(54) DECELERATION CONTROL DEVICE OF VEHICLE

(71) Applicant: MAZDA MOTOR CORPORATION, Hiroshima (JP)

(72) Inventors: Toshihiro Matsuoka, Higashihiroshima (JP); Daiki Nakata, Higashihiroshima (JP); Kouji Tokunaga, Hiroshima (JP); Yohsuke Takenaga, Hatsukaichi (JP); Norimichi Tanaka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 113 days.

(21) Appl. No.: 15/989,517

(22) Filed: May 25, 2018

(65) Prior Publication Data

US 2019/0003584 A1 Jan. 3, 2019

(30) Foreign Application Priority Data

Jun. 29, 2017 (JP) .................................. 2017-127310

(51) Int. Cl.
*F16H 61/66* (2006.01)
*F16H 59/02* (2006.01)
*F16H 61/02* (2006.01)
*F16H 61/21* (2006.01)
*F16H 59/08* (2006.01)

(52) U.S. Cl.
CPC ..... *F16H 61/0213* (2013.01); *F16H 59/0204* (2013.01); *F16H 61/21* (2013.01); *B60Y 2200/92* (2013.01); *B60Y 2300/18125* (2013.01); *F16H 2059/082* (2013.01); *F16H 2061/0234* (2013.01)

(58) Field of Classification Search
CPC ..... F16H 2061/6616; F16H 2059/0252; F16H 2059/0239
See application file for complete search history.

(56) References Cited

U.S. PATENT DOCUMENTS

| 10,139,001 | B2* | 11/2018 | Oguri | ............... F16H 61/66259 |
| 2006/0248976 | A1* | 11/2006 | Sickart | ............... F16H 59/0204 |
| | | | | 74/473.18 |
| 2011/0138955 | A1* | 6/2011 | Sickart | ............... F16H 59/0204 |
| | | | | 74/473.3 |

(Continued)

FOREIGN PATENT DOCUMENTS

| EP | 0976954 A2 * | 2/2000 | ......... F16H 61/0206 |
| JP | H06-066369 A | 3/1994 | |
| JP | H09-196155 A | 7/1997 | |

(Continued)

*Primary Examiner* — Tisha D Lewis
(74) *Attorney, Agent, or Firm* — Studebaker & Brackett PC

(57) ABSTRACT

A shift lever is configured to take deceleration-requesting positions through its operation in a specified direction from an M-range position for a manual mode. A control is configured such that vehicle's deceleration is larger when an operational quantity of a one-time operation of the shift lever operated toward the deceleration-requesting positions B1, B2, B3 is larger. For example, when the shift lever is operated to the position B1, one-stage shift down is performed, when the shift lever is operated to the position B2, two-stage shift down is performed, and when the shift lever is operated to the position B3, three-stage shift down is performed.

11 Claims, 12 Drawing Sheets

(56) References Cited

U.S. PATENT DOCUMENTS

2012/0166053 A1* 6/2012 Nishida .................. F16H 59/20
                                                        701/52
2013/0178333 A1* 7/2013 Plath ..................... B60W 10/11
                                                        477/94

FOREIGN PATENT DOCUMENTS

| JP | H09-317872 A | 12/1997 |
| JP | 2003-267088 A | 9/2003 |
| JP | 2006-022913 A | 1/2006 |
| JP | 2011-133076 A | 7/2011 |
| JP | 2015-152053 A | 8/2015 |

* cited by examiner

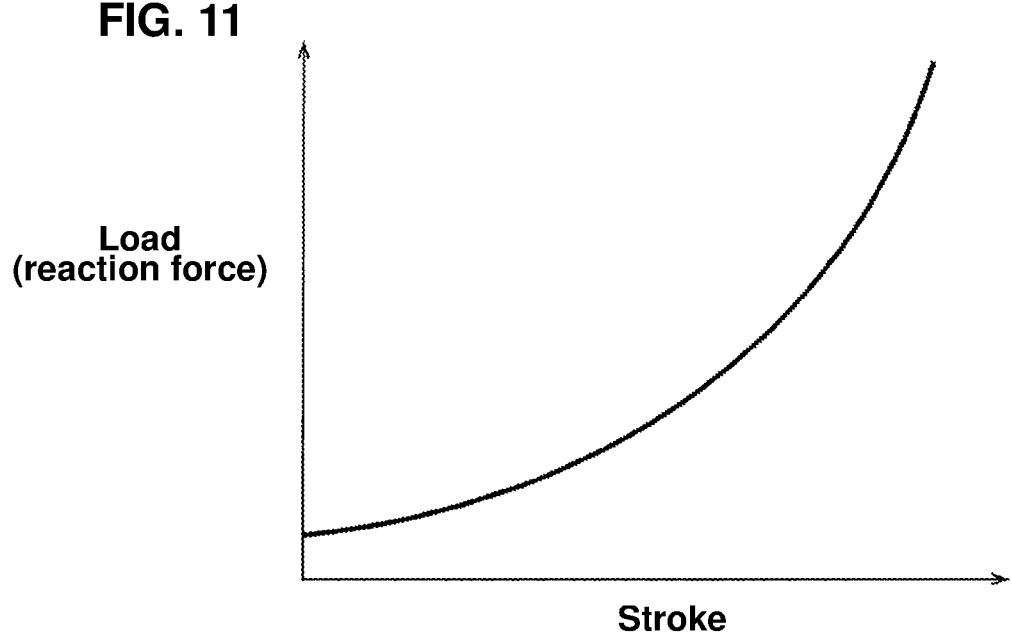

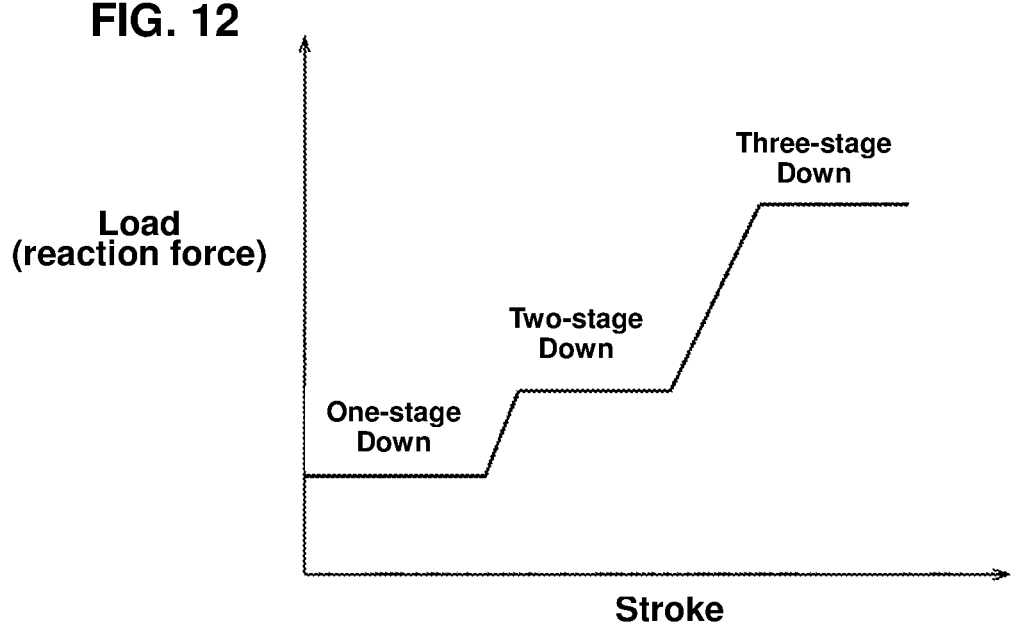

DECELERATION CONTROL DEVICE OF VEHICLE

BACKGROUND OF THE INVENTION

The present invention relates to a deceleration control device of a vehicle provided with a shift lever.

In a vehicle, shift down (i.e., move into low gear) is performed at a transmission to increase vehicle's deceleration in vehicle's traveling on a down slope or during rapid deceleration, for example. Japanese Patent Laid-Open Publication No. 9-317872 discloses a technology in which a shift map for engine brake is adjusted in accordance with the number of times of operation to a low speed stage (low-speed gear ratio). Japanese Patent Laid-Open Publication No. 2015-152053 discloses a technology in which an engine-brake force which is resistance of a power plant is changed in accordance with the number of times of operation of a shift lever from a D-range position to a B range which is provided beside the D-range position.

Further, there exists another technology which is practically applied to a vehicle provided with a multi-stage (multi-gear ratio) type of stepped automatic transmission, in which in a state where a shift lever is positioned at an M range provided beside a D range, a shift-down command for one-stage (one-gear ratio) shift down is outputted by operating the shift lever forward, and a shift-up command for one-stage (one-gear ratio) shift up is outputted by operating the shift lever rearward.

There exists further another practically-applied technology in which an S-range position and an L-range position are arranged in series relative to a D-range position. That is, in a case of a forward 5-stage ($1^{st}$ speed-$5^{th}$ speed of gear ratios) automatic transmission, for example, while an automatic gear change is performed among all shift stages of $1^{st}$ speed-$5^{th}$ speed of gear ratios at the D-range position, the automatic gear change is performed among $1^{st}$ speed-$4^{th}$ speed of gear ratios at the S-range position and the automatic gear change is performed among $1^{st}$ speed-$3^{rd}$ speed of gear ratios at the L-range position so that the maximum shift stage to be obtained becomes a lower speed stage compared to a case of the D-range position.

Moreover, in a vehicle provided with an electric motor as the power plant in which a gear ratio (a speed ratio) of a transmission is fixed or there is no transmission, there exists a deceleration control device in which a shift lever is operable for selecting at least a D range, an R range, an N range (neutral range), a P range (parking range), and a B range and an M range which are selected for obtaining shift-down feeling of the automatic transmission which is expected when an accelerator is eased off.

The deceleration control using resistance which is caused by a loss or regeneration of the power plant in a driven state through above-described shift lever operation preferably reduces burden of a frictional type of brake device of a normal foot brake, suppresses wear of the brake device, or prevents vaper lock or fade phenomenon of the brake device in vehicle's traveling on a steep down slope.

A conventional device has a problem that the shift-lever operation for requesting the shift down needs plural times of operation when a driver conducts two or more stages of shift down for wanting large deceleration of the vehicle, so that the desired deceleration may not be obtained easily and promptly. That is, there is a concern that one-time operation of the shift lever for providing one-stage shift down may not achieve the desired deceleration. In this case, the shift down for the two-stage shift down may be finally required by operating the shift down twice, or the shift down for the three-stage shift down may be finally required by operating the shift down three times.

In particular, a recently-used multi-stage type of stepped automatic transmission adopts a forward many-stage type, such as a forward 8-stage, 9-stage, or 10-stage type, so that a change amount in the gear ratio between adjacent shift stages becomes so small that the one-stage shift down may not create sufficient deceleration any more.

Further, in the automatic transmission using the S range or the L range, since the maximum shift stage to be obtained is merely restricted, there may exist a case where the shift down is not performed when the shift lever is operated from the D range to the S range or the L range. That is, when the current shift stage in the D range corresponds to the shift stage which is lower than the maximum shift stage to be obtained in the S range or the L range, no shift down may be performed even if the shift lever is operated to the S range or the L range.

SUMMARY OF THE INVENTION

In view of the above-described matters, an object of the present invention is to provide a deceleration control device of a vehicle provided with a shift lever which can promptly obtain the desired deceleration through the one-time operation of the shift lever.

The present invention is a deceleration control device of a vehicle which changes deceleration of the vehicle by changing a drive state of a driving wheel comprises a deceleration changing mechanism to change the deceleration of the vehicle, a controller to control the deceleration changing mechanism, a shift lever operable from a specified position to a deceleration-requesting position, and an operational-quantity detector to detect an operational quantity of a one-time operation of the shift lever which is operated from the specified position toward the deceleration-requesting position, wherein the controller is configured to control the deceleration changing mechanism such that the deceleration of the vehicle is larger when the operational quantity detected by the operational-quantity detector is larger.

According to the present invention, since the resistance force to decelerate the vehicle which is caused by the deceleration changing mechanism is controlled so as to be larger when the operational quantity of the one-time operation of the shift lever operated toward the deceleration-requesting position is larger, the deceleration desired by a driver can be obtained easily and promptly over a wide range from the smaller deceleration to the larger deceleration.

In an embodiment of the present invention, the deceleration changing mechanism is an automatic transmission which changes the drive state of the driving wheel, the controller is configured to control a gear ratio of the automatic transmission, and the gear ratio of the automatic transmission controlled by the controller is shifted down to a low-speed side such that the deceleration of the vehicle is larger when the operational quantity detected by the operational-quantity detector is larger.

According to this embodiment, the shift down to the shift stage (gear ratio) to obtain the deceleration desired by the driver can be performed at one time in the vehicle to which the automatic transmission is installed.

In another embodiment of the present invention, the automatic transmission is a stepped automatic transmission having plural shift stages, and the controller is configured to control the automatic transmission such that the number of stage of speed change to shift down by the automatic transmission is more when the operational quantity detected by the operational-quantity detector is larger.

According to this embodiment, the shift down to the shift stage (gear ratio) to obtain the deceleration desired by the driver can be performed at one time in the vehicle to which the widely-used stepped automatic transmission having the plural shift stages is installed.

In another embodiment of the present invention, the maximum of the number of stage of speed change to shift down which is controlled by the controller is two.

This embodiment is preferable in the automatic transmission having the small number of forward-traveling stages in which the change amount in the gear ratio between the adjacent shift stages is large.

In another embodiment of the present invention, the maximum of the number of stage of speed change to shift down which is controlled by the controller is three of more.

This embodiment is preferable in the automatic transmission having the large number of forward-traveling stages in which the change amount in the gear ratio between the adjacent shift stages is small.

In another embodiment of the present invention, the deceleration changing mechanism is a generator which is driven by an engine of the vehicle and capable of generating power for regeneration, the controller is configured to control a regenerative power-generation quantity generated by the generator, and the regenerative power-generation quantity of the generator controlled by the controller is increased such that the deceleration of the vehicle is larger when the operational quantity detected by the operational-quantity detector is larger.

According to this embodiment, the deceleration desired by the driver can be obtained easily and promptly by using the generator which can perform the regenerative power generation to cause the resistance force to decelerate the vehicle.

In another embodiment of the present invention, the deceleration changing mechanism comprises an automatic transmission which changes the drive state of the driving wheel and a generator which is driven by an engine of the vehicle and capable of generating power for regeneration, the controller is configured to concurrently control a gear ratio of the automatic transmission and a regenerative power-generation quantity generated by the generator, and the gear ratio of the automatic transmission controlled by the controller is shifted down to a low-speed side and the regenerative power-generation quantity of the generator controlled by the controller is increased such that the deceleration of the vehicle is larger when the operational quantity detected by the operational-quantity detector is larger.

According to this embodiment, the deceleration desired by the driver can be obtained more easily and promptly by using both the shift-down control of the automatic transmission and the regenerative power-generation control of the generator.

In another embodiment of the present invention, the deceleration control device further comprises a first determiner to determine target deceleration in accordance with the operational quantity detected by the operational-quantity detector, and a second determiner to determine the number of stage of speed change to shift down controlled by the automatic transmission and the regenerative power-generation quantity generated by the generator such that the target deceleration determined by the first determiner is obtained, wherein the controller is configured to perform the shift-down control of the automatic transmission by the number of stage of speed change to shift down determined by the second determiner and control the generator so as to generate the regenerative power-generation quantity determined by the second determiner.

According to this embodiment, the deceleration can be properly adjusted at the target deceleration by harmoniously controlling the shift down by the automatic transmission and the regenerative power-generation quantity generated by the generator.

In another embodiment of the present invention, the deceleration control device further comprises a shift gate for guiding a move of the shift lever, wherein the shift gate comprises a main gate portion where a parking range, a reverse range, a neutral range, and a drive range are arranged in series from one-end side of the shift gate toward the other-end side of the shift gate in order, a sub gate portion where a manual range and the deceleration-requesting position are arranged in series, and a connecting gate portion which interconnects a drive-range position of the main gate portion and a manual-range position of the sub gate portion, the main gate portion and the sub gate portion are arranged in parallel on right-and-left sides, and the deceleration-requesting position is configured to extend from the manual-range position toward a parking-range position.

According to this embodiment, the shift gate (a gate panel forming the shift gate) can be made properly small, and the operability of the shift lever can be made appropriate.

In another embodiment of the present invention, when the shift lever is operated toward the deceleration-requesting position, the shift lever is configured to be held at a current position as long as the shift lever is not operationally returned.

According to this embodiment, the driver can easily recognize how much the desired deceleration is requested from a position of the shift lever which has been operated toward the deceleration-requesting position.

In another embodiment of the present invention, the operational quantity detected by the operational-quantity detector includes a stroke of the shift lever.

Accordingly to this embodiment, the deceleration desired by the driver can be properly detected in particular.

Other features, aspects, and advantages of the present invention will become apparent from the following description which refers to the accompanying drawings.

BRIEF DESCRIPTION OF THE DRAWINGS

FIG. 11 is a graph showing an example of setting of the stroke of the shift lever operated toward the deceleration-requesting positions and a load (reaction force).

FIG. 12 is a graph showing an example of setting of the stroke of the shift lever operated toward the deceleration-requesting positions, the load (reaction force), and a shift-down stage.

DETAILED DESCRIPTION OF THE INVENTION

Figure 1:
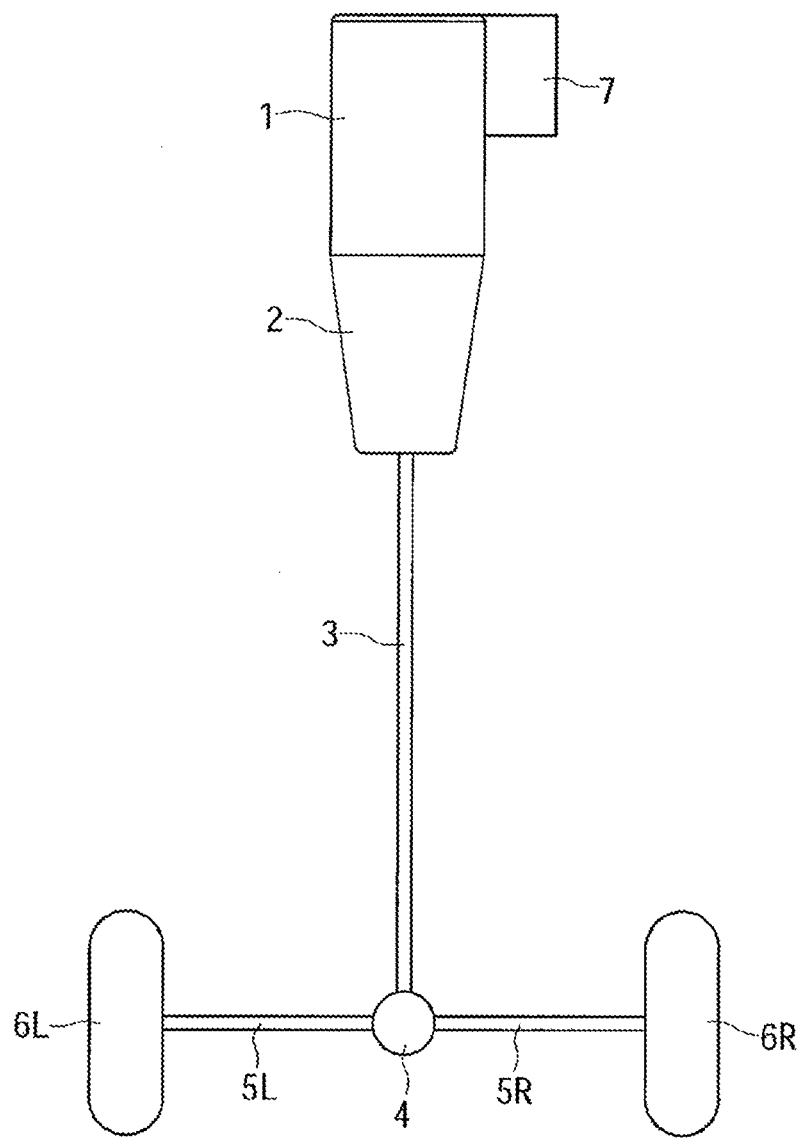
FIG. 1 is a schematic plan view showing an example of a drive system of a vehicle to which the present invention is applied.

In FIG. 1, reference character 1 denotes an engine, and reference character 2 denotes a multi-stage (multi-gear ratio) type of stepped automatic transmission (which serves as a deceleration changing mechanism to change deceleration of a vehicle). An output of the engine 1 is transmitted to right-and-left driving wheels 6L, 6R through the automatic transmission 2, a propeller shaft 3, a deferential gear 4, and right-and-left drive shafts 5L, 5R when a vehicle travels, being driven by the engine 1. Herein, while the automatic transmission 2 of a present embodiment is configured to be a forward 8-stage ($1^{st}$ speed-$8^{th}$ speed of gear ratios) automatic transmission, the present invention is not limited to this type and any number-stage type of the automatic transmission is applicable, such as 6-stage, 7-stage or 10 stage.

During vehicle's deceleration, a rotational force of the driving wheels 6L, 6R is transmitted on the above-described path in a reverse direction, which provides a state in which engine braking (a resistance force to decelerate the vehicle) is generated. The quantity of the engine braking is changeable by changing the shift stage of the automatic transmission 2. Further, the quantity of the engine braking is changeable by changing an opening of a throttle valve of the engine 1.

A generator 7 (which serves as another deceleration changing mechanism to change the deceleration of the vehicle) is driven by the engine 1. The generator 7 is configured to be large-sized so as to obtain a large regenerative force positively. During the deceleration, the resistance force to decelerate the vehicle can be increased more by making the generator 7 generate a power in addition to the above-described engine braking. While changing of the deceleration by gear-ratio changing of the automatic transmission 2 is stepwise, the power generation of the generator 7 is changeable continuously (steplessly), so that the deceleration comprehensively obtained by both the engine braking and the power generation can be made continuous (substantially continuous).

Figure 2:
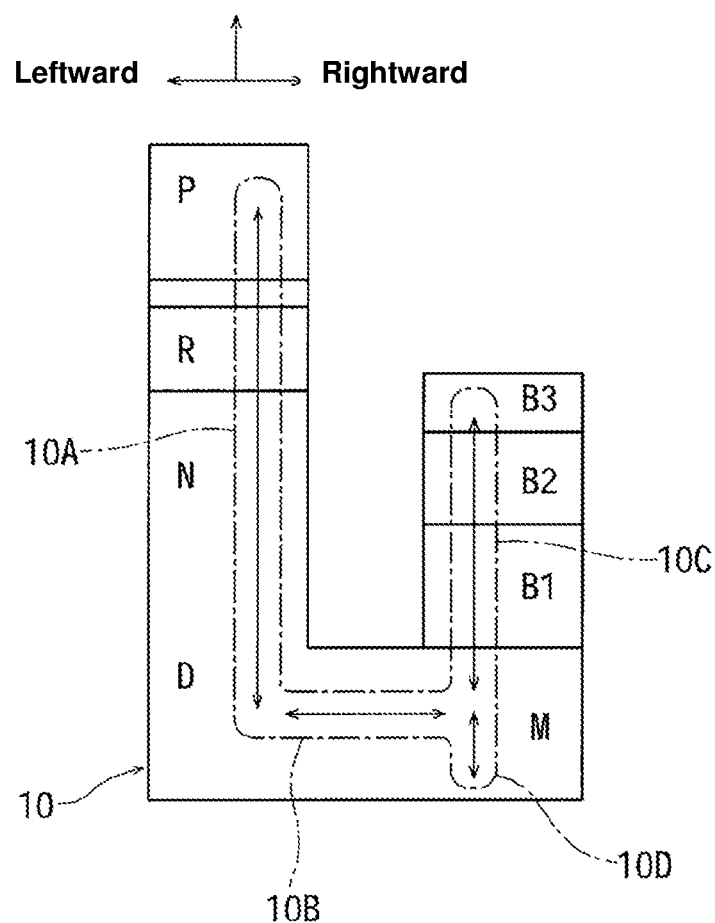
FIG. 2 is a schematic plan view showing positions and moves of a shift lever.

FIG. 2 shows a gate panel 10 which guides a shift lever, which will be describe later, of the automatic transmission 2. This gate panel 10 is placed on an upper surface of a center console, for example. As apparent from FIG. 2, a P (parking) range, an R (reverse) range, an N (neutral) range, and a D (drive) range are arranged in series from a forward side to a rearward side in order as respective range positions. An M range (a manual range, which a specified position corresponds to) is arranged on a rightward side (a driver's seat side) of the D range. Deceleration-requesting positions B1, B2, B3 are arranged in series toward the forward side from the M range in order. A shift-up position is provided in back of the M range.

In the embodiment, the shift lever serves as a kind of switch to command the gear-range shift, that is, the shift lever commands the gear-range shift in a fly-by-wire manner where an action does not mechanically act on an oil circuit of the automatic transmission. Accordingly, the shift lever operated by the driver is made extremely small-sized, and a size of the gate panel 10 is small accordingly. The small-sized gate panel 10 (i.e., the shift lever) can be arranged at any appropriate place, such as an instrument panel, so that gate panel 10 is operable by the driver.

A shift control with the shift lever is configured such that when the shift lever is operated to the deceleration-requesting position B1, the one-stage shift down (i.e., the move into low gear by one-gear ratio) is commanded. Further, when the shift lever is operated to the deceleration-requesting position B2, the two-stage shift down (i.e., the move into low gear by two-gear ratios) is commanded. When the shift lever is operated to the deceleration-requesting position B3, the three-stage shift down (i.e., the move into low gear by three-gear ratios) is commanded. These will be described specifically later. Moreover, when the shift lever is operated rearward from the M range, the shift up for one stage is commanded.

Gate portions 10A-10D (a gate hole formed at the gate panel 10) which constitute a shift gate are illustrated in a dash line in FIG. 2. That is, the gate portion positioned between the P range and the D range is denoted by reference character 10A (corresponding to a main gate portion), the gate portion positioned between the D range and the M range is denoted by reference character 10B (corresponding to a connecting gate portion), the gate portion positioned between the M range and the foremost deceleration-requesting position B3 is denoted by reference character 10C (corresponding to a sub gate portion), and the gate portion positioned between the M range and a shift-up requesting position is denoted by reference character 10D. Herein, the gate portion 10D is designed so as to stop a retreat of the shift lever, which is configured to extremely short actually.

Figure 3:
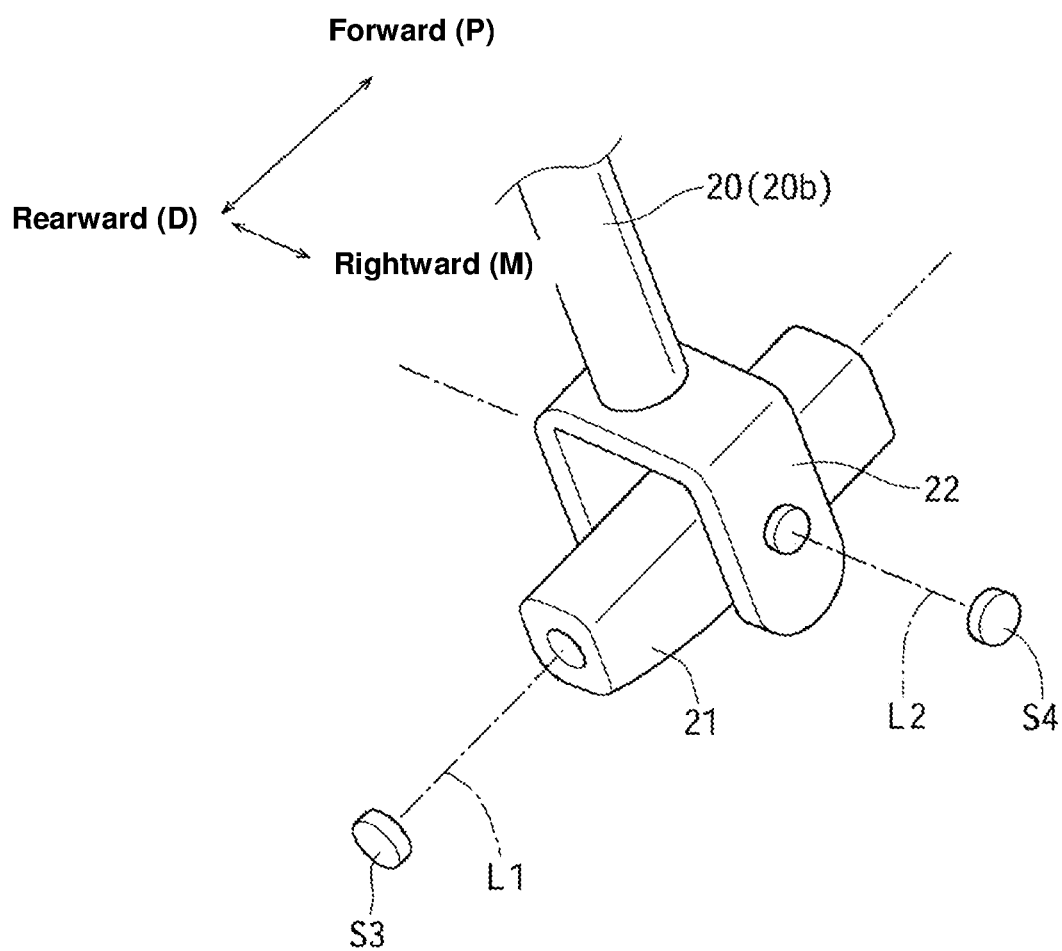
FIG. 3 is a major-part perspective view showing a structural example for obtaining swings, in a longitudinal direction and in a lateral direction, of the shift lever.

Next, portions related to the shift lever will be described referring to FIGS. 3-5, and this shift lever is denoted by reference character 20. First, as shown in FIG. 3, a first member 21 which is held at a vehicle body is configured to be rotatable (swingable) around an axial line L1 which extends in the longitudinal direction. Further, a second member 22 which is held at the first member 21 is configured to be rotatable (swingable) around an axial line L2 which extends in the lateral direction. A base end portion of the shift lever 20 is fixed to the second member 22.

A swing around the axial line L2 is a move, in the longitudinal direction, of the shift lever 20 along the gate portions 10A, 10C and 10D shown in FIG. 2. Further, a swing around the axial line L1 is a move, in the lateral direction, of the shift lever 20 along the gate portion 10B.

Figure 4:
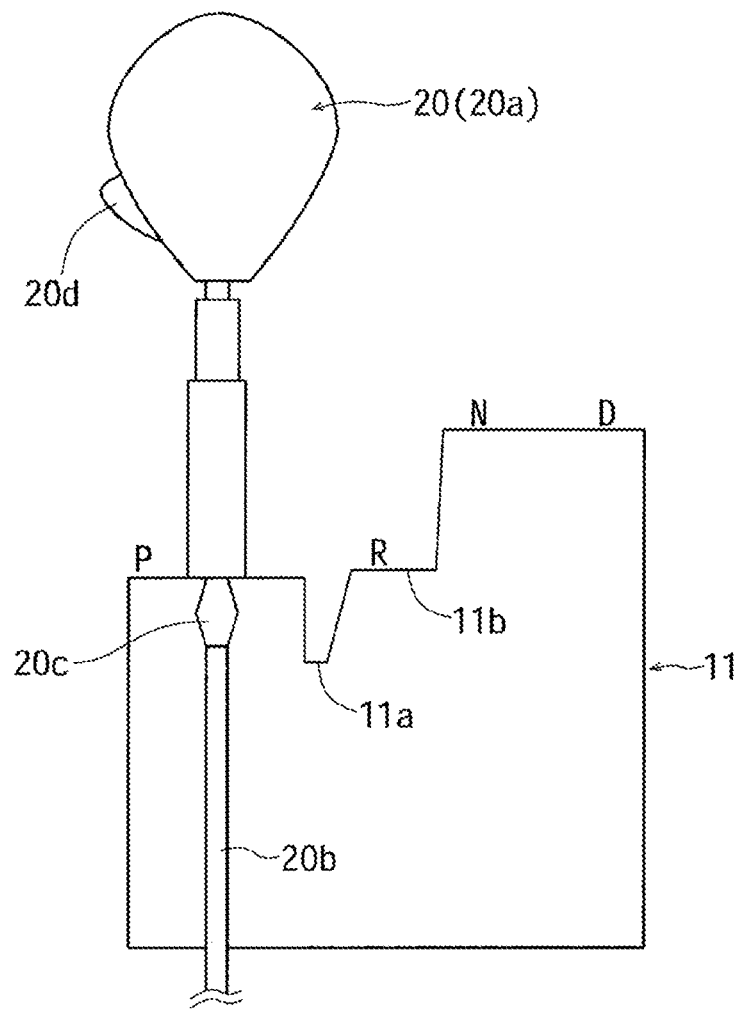
FIG. 4 is a schematic side view showing a guide plate and the shift lever which are located between a P-range position and a D-range position.
Figure 5:
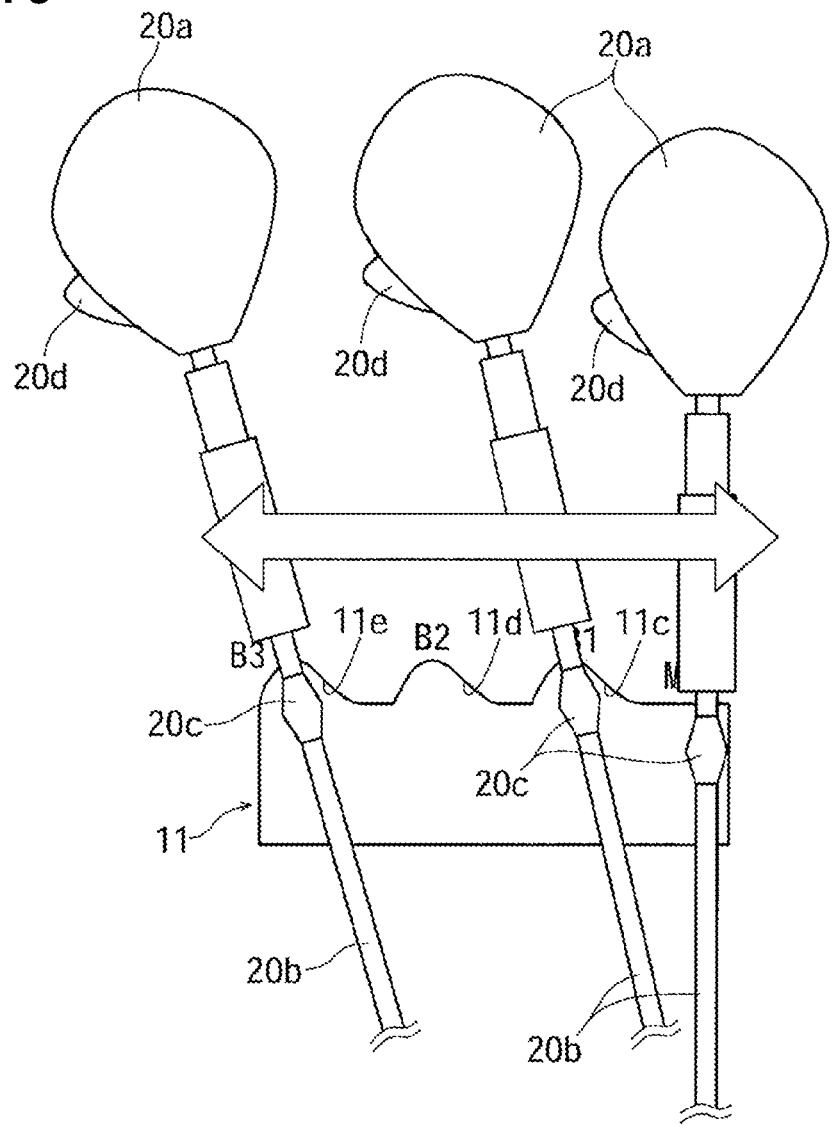
FIG. 5 is a schematic side view showing the guide plate and the shift lever which are located among an M-range position and deceleration-requesting positions.

An upper end portion of the shift lever 20 is operated by the driver as an operational portion 20a as shown in FIGS. 4 and 5. Further, a guide pin 20c is slidably attached to a rod portion 20b which extends from the operational portion 20a and is continuous to the second member 22.

A guide pin 20c is biased upward by a spring, not illustrated. Further, the guide pin 20c is configured to be displaceable downward by a specified degree against a biasing force of the spring when receiving an external force downward, but its further downward displacement is restricted by locking. For example, a lock releasing button 20d to be press-operated is provided at the operational portion 20a, and the above-described locking is released by the driver's press-operating the lock releasing button 20d, thereby allowing the guide pin 20c to be displaced downward greatly.

As shown in FIG. 4, a step portion 11a which protrudes downward greatly is formed at a portion of the guide panel 11 arranged below the gate panel 10 which is positioned between the P range and the D range, and another step portion 11a is formed at another portion of the guide panel 11 which is positioned between the R range and the N range. Thereby, the shift lever 20 is configured to be movable between the D range and the N range without operating the lock releasing button 20d. Meanwhile, in a case where the shift lever 20 is operated between the P range and the R range, the shift lever 20 is moved in a state where the lock releasing button 20d is press-operated (where the guide pin 20c is displaced downward greatly). Further, moving of the shift lever 20 from the R range to the N range is allowed freely, but its moving from the N range to the R range is allowed in a state where the lock releasing button 20d is press-operated.

As shown in FIG. 5, engaging recess portions 11c, 11d, 11e are formed at the guide panel 11 at the respective deceleration-requesting positions B1, B2, B3. When the guide pin 20c is engaged with any of the engaging recess portions 11c-11e, the shift lever 20 is held at its position. Some reaction force is generated so as to give a click (detent) feeling to the driver when the guide pin 20d comes to be engaged with any of the engaging recess portions 11d-11e or locking of the guide pin 20d comes to be released. Herein, the shift lever 20 is moved between the deceleration-requesting positions B1-B3 and the M range by operating the shift lever 20 in the longitudinal direction without press-operating the lock releasing button 20d.

When the shift lever 20 is operated rearward from the M range to the shift-up position, the shift lever 20 is automatically returned to the M range by means of a return spring, not illustrated, by releasing an operational force of the shift lever 20.

The position of the shift lever 20 is detected by sensors S3, S4. The sensor S3 detects a swing position of the shift lever 20 swinging around the axial line L1. That is, the position, in the lateral direction, of the shift lever 20, i.e., whether the shift lever 20 is positioned on a leftward side where the D range exists or on a rightward side where the M range exits, is determined by the sensor S3.

The sensor S4 detects the position, in the longitudinal direction, of the shift lever 20. That is, the sensor S4 detects where the shift lever 20 is positioned, i.e., which position of the P range, the R range, the N range, and the D range the shift lever 20 is located at, in a state where it is detected by the sensor S3 that the shift lever 20 is positioned on the leftward side. Further, the sensor S4 determines the M range, the deceleration-requesting position B1, the deceleration-requesting position B2, the deceleration-requesting position B3, or the shift-up position (the rearward swing from the M range) in a state where it is detected by the sensor S3 that the shift lever 20 is positioned on the rightward side. Herein, detection of the shift-up requesting which is executed by the shift lever 20 being operated rearward from the M range can be performed by an additionally-provided switch.

Figure 6:
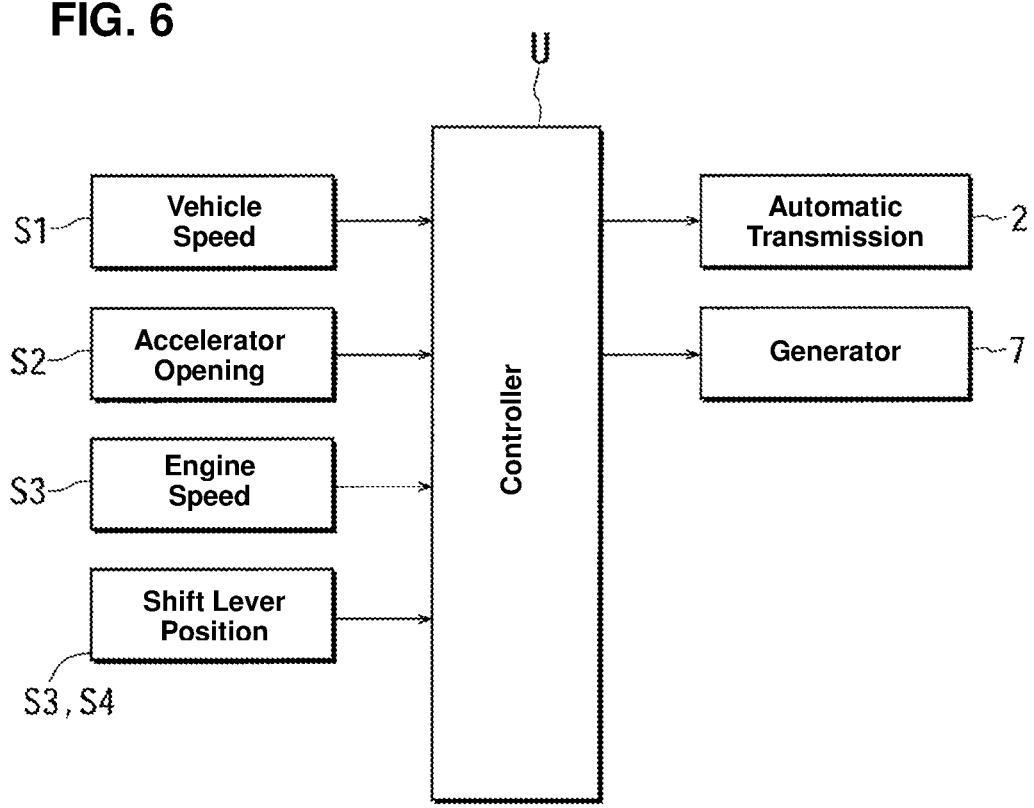
FIG. 6 is a block diagram showing an example of a control system of the present invention.

Next, a control for obtaining the desired deceleration of the vehicle will be described referring to the shift-down control according to the deceleration-requesting positions B1-B3, in particular. In FIG. 6, reference character U denotes a controller (control unit) which is constituted by a microcomputer. Signals from sensors S1, S2, additionally to the above-described sensors S3, S4, are inputted to the controller U. The sensor S1 is a vehicle speed sensor to detect a vehicle speed. The sensor S2 is an accelerator opening sensor to detect an accelerator opening (an engine load). Further, the controller U controls the automatic transmission 2 and the generator 7.

Next, an example of the control of the controller U will be described referring to a flowchart of FIG. 7. In the control example of FIG. 7, changing of the deceleration of the vehicle is performed only by the shift-down control performed by the automatic transmission 2. Reference character Qn shows each control step in the flowing descriptions.

First, it is determined in step Q1 whether or not the current range is the M range. When the determination of the step Q1 is NO, it is determined that the shift lever 20 is positioned at any of the P range, the R range, the N range, and the D range. In this case, the control in accordance with the range position where the shift lever 20 is positioned is performed in step Q2. Herein, when the shift lever 20 is positioned at the D range, the shift control of the automatic transmission 2 is performed based on a shift map where the vehicle speed and the accelerator opening are set as parameters, similarly to a conventional control.

When the determination of the step Q1 is YES, it is determined in step Q3 whether or not the shift-up operation is conducted, that is, whether or not the shift lever 20 is operated rearward from the M range. When the determination of the step Q3 is YES, it is determined in step Q4 whether or not the current shift stage is the maximum shift stage (the $6^{th}$ speed in the present embodiment). When the determination of the step sQ4 is NO, the shift-up command for one-stage (one-gear ratio) shift up is outputted in step Q5 (the one-stage shift-up control is performed at the automatic transmission 2). Further, when the determination of the step Q4 is NO, the current shift stage, i.e., the maximum shift stage (the $6^{th}$ speed), is maintained in step Q6.

When the determination of the step Q3 is NO, it is determined in step Q7 whether or not the shift-down operation is conducted, that is, whether or not the shift lever 20 is operated forward from the M range. When the determination of the step Q7 is NO, the current shift stage (the current gear ratio) is maintained in step Q8.

When the determination of the step Q7 is YES, a stage number DK to shift down is determined based on the forward operational quantity (the stroke according to the embodiment) of the shift lever 20 in step Q9. That is, when the forward operational quantity of the shift lever 20 corresponds to its operation to the deceleration-requesting position B1, the stage number DK=1 is set so that the one-stage (one-gear ratio) shift down can be performed. Further, when the forward operational quantity of the shift lever 20 corresponds to its operation to the deceleration-requesting position B2, the stage number DK=2 is set so that the two-stage shift down can be performed. When the forward operational quantity of the shift lever 20 corresponds to its operation to the deceleration-requesting position B3, the stage number DK=3 is set so that the three-stage shift down can be performed.

When the shift down set in the step Q9 is performed, it is determined in step Q10 whether or not the engine speed of the engine 1 exceeds a maximum allowable speed. When the determination of the step Q10 is YES, 1 is deducted from the stag number DK determined in the step Q9, and then a control sequence is returned to the step Q10.

When the determination of the step Q10 is NO, the command to perform the shift down by the stage number DK at one time is outputted in step Q12. In the processing of the step Q12, for example, in a case of the stage number DK=3 with a current gear ratio of the 6$^{th}$ speed, the shift down to the 3$^{rd}$ speed is performed. Further, in a case of stage number DK=2 with the current gear ratio of the 6$^{th}$ speed, the shift down to the 4$^{th}$ speed is performed. In a case of the stage number DK=1 with a current gear ratio of the 5$^{th}$ speed, the shift down to the 4$^{th}$ speed is performed.

Figure 7:
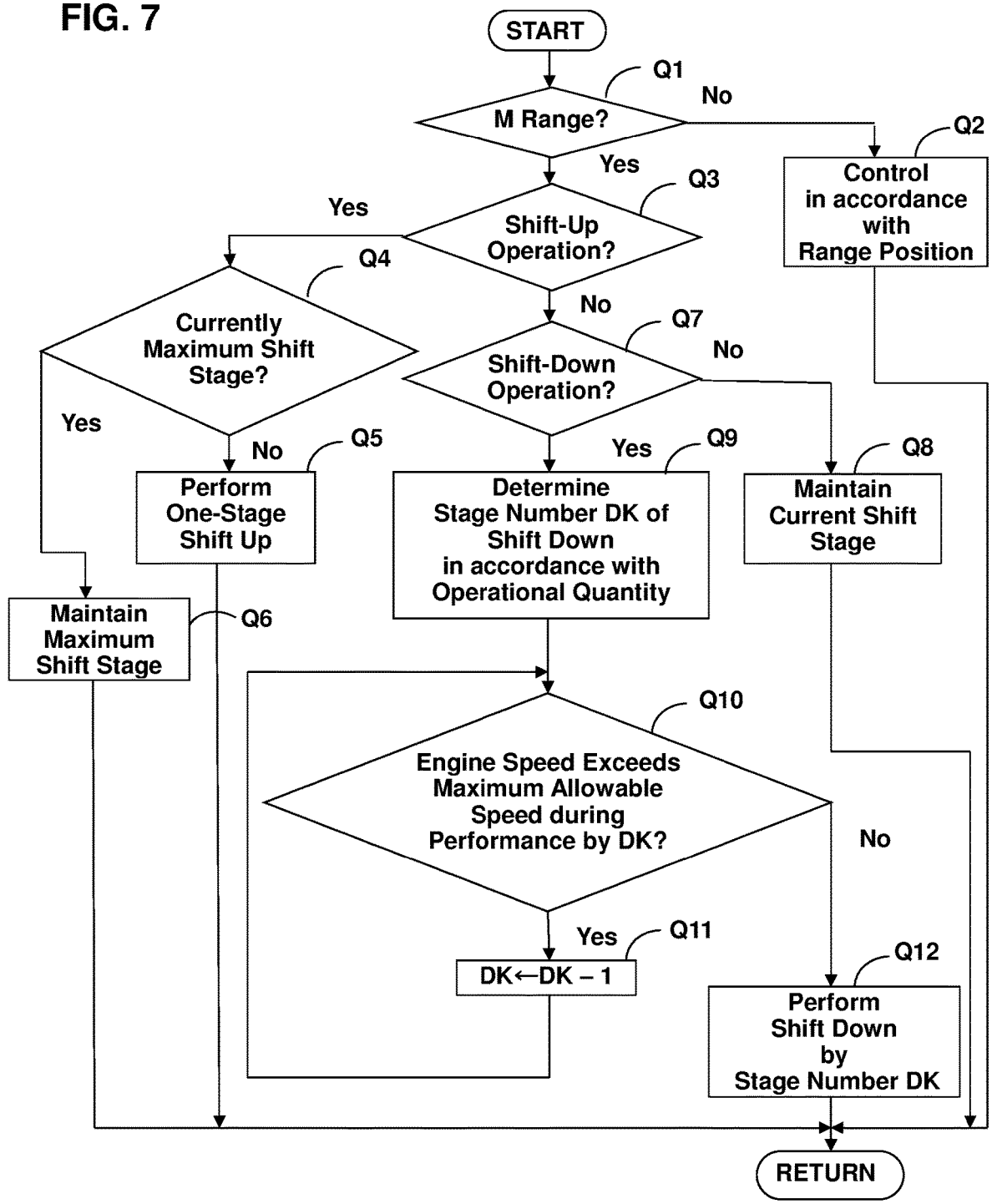
FIG. 7 is a flowchart showing an example of a control of the present invention.
Figure 8:
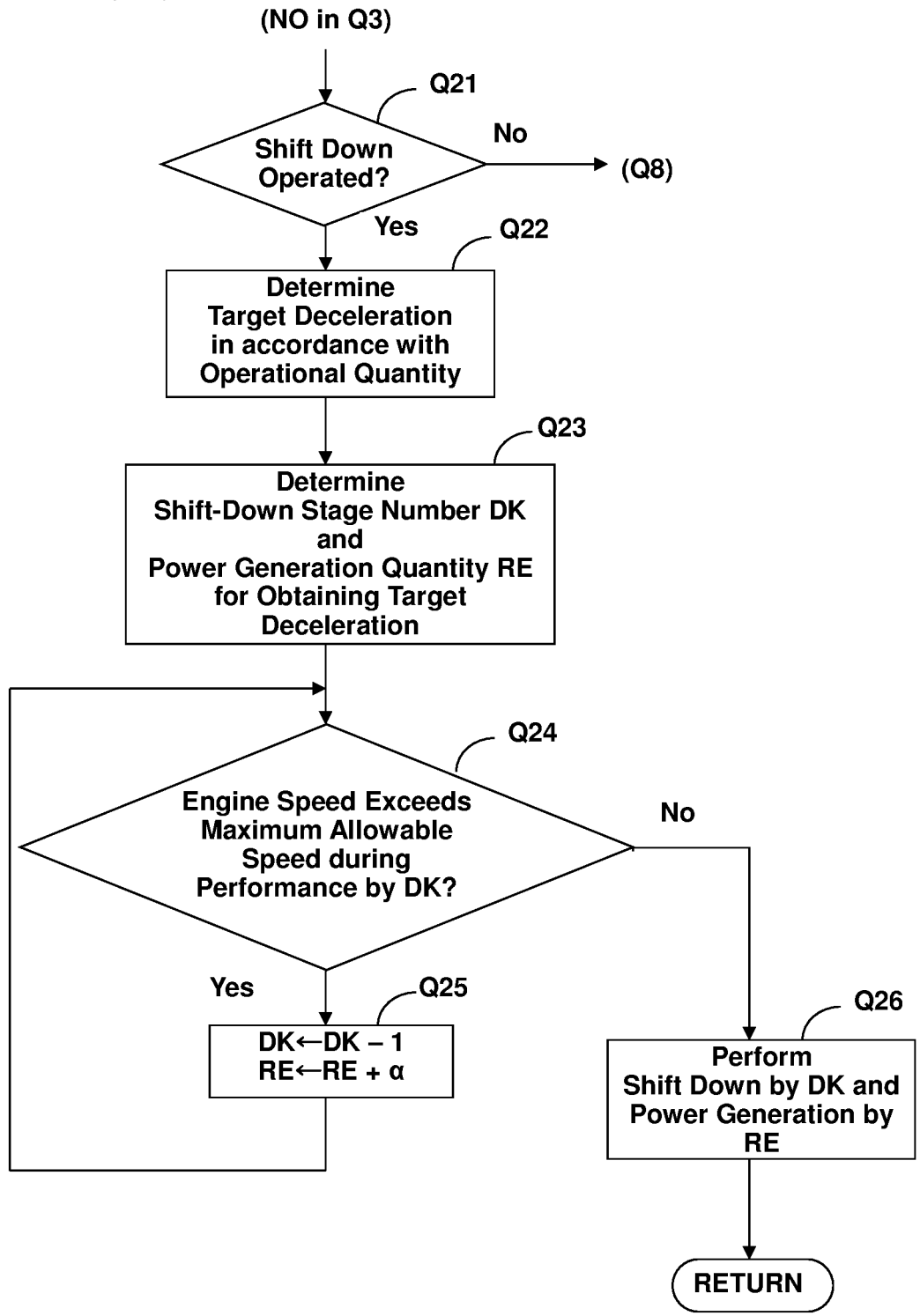
FIG. 8 is a flowchart showing another example of the control of the present invention.
Figure 9:
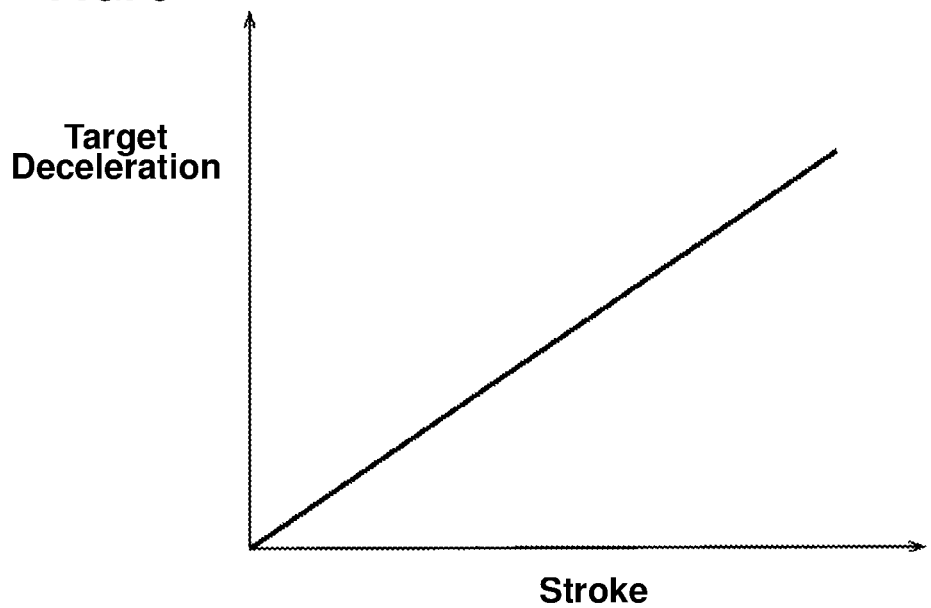
FIG. 9 is a graph showing a relationship between a stroke of the shift lever operated toward the deceleration-requesting position and target decelerations.

FIG. 8 shows another example of the control of the controller U, which corresponds to a processing after the determination of the step Q3 being YES in FIG. 7. In the present embodiment, when the determination of step Q21 is YES, that is, when the shift-down operation is conducted, target deceleration is set based on the operational quantity of the shift lever 20 in step Q22. The target deceleration is set, as shown in FIG. 9, such that the target deceleration is larger when the forward stroke quantity of the shift lever 20 is larger. While the target deceleration is set like a liner characteristic in FIG. 9, a nonlinear characteristic such that an increase rate of the target deceleration is larger when the stroke is larger, for example, may be applied.

After the step Q22, the stage number DK to shift down for obtaining the target deceleration and a power generation quantity, i.e., a regenerative power-generation quantity, RE generated by the generator 7 are determined in step Q23. While changing of the deceleration by the shift down is stepwise, the deceleration can be changed continuously (substantially continuous) by continuously (continuously variably) changing the power generation quantity of the generator 7.

After the step Q23, it is determined in step Q24 whether or not the speed of the engine 1 exceeds the maximum allowable speed when the shift down is performed by the stage number DK. When the determination of the step Q24 is YES, 1 (one) is deducted from the stage number DK and the regenerative power-generation quantity RE is incremented for compensating this reduction of the stage number in step Q24. After the step Q25, the control sequence is returned to the step Q24.

When the determination of the step Q24 is NO, the shift down is performed by the set stage number DK at one time and also the generator 7 is performed so that the power generation quantity becomes the quality RE in step Q26.

Figure 10:
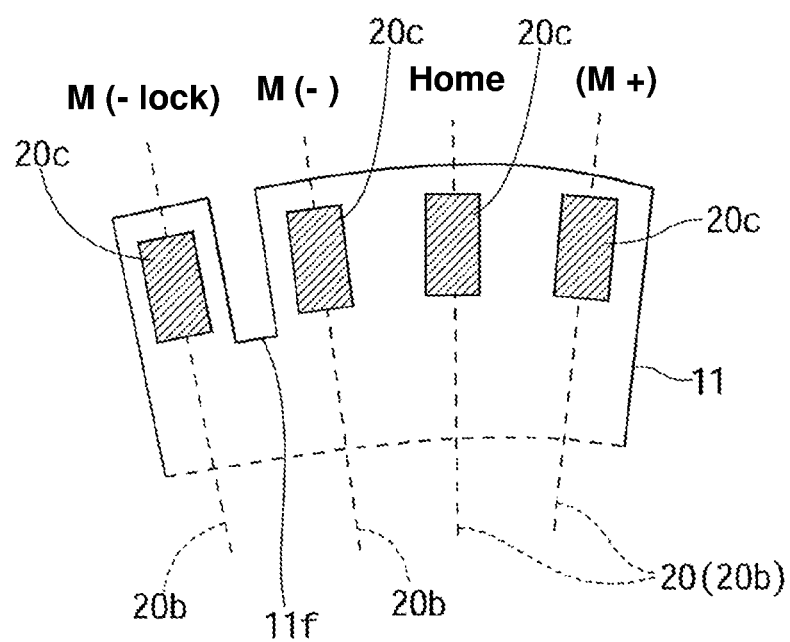
FIG. 10 is a schematic side view showing another structural example in which the guide plate and the shift lever which are constituted among the M-range position and the deceleration-requesting positions.

FIG. 10 shows another embodiment of the present invention, which is a modified example of FIG. 5. In the present embodiment, a step portion 11f which extends downward is formed between the M range and the deceleration-requesting position. A forming position of the step portion 11f is set between the deceleration-requesting positions B1, B2, so that the shift lever 20 cannot ride over this portion without press-operating the lock releasing button 20c. The shift lever 20 is biased all the time so as to be returned to a home position between the deceleration-requesting position B1 and the shift-up requesting position (a momentary type). Herein, in the present embodiment, the deceleration-requesting positions B1, B2 are provided only, and the deceleration-requesting position B3 is not provided (the shift down for the three-stage shift down is not performed).

When the shift lever 20 positioned at the M range is operated toward the deceleration-requesting position B1, the shift lever 20 is stopped at the deceleration-requesting position B1, being engaged with the step portion 11f, as long as the lock releasing button 20c is not press-operated. When the driver takes a hand off the shift lever 20, the shift lever 20 is automatically returned to the M range (the home position). Thus, the operation of the shift lever 20 is extremely easy when the shift down for the one-stage shift down, which may be desired often, is requested.

When the two-stage shift down is required, the shift lever 20 positioned at the M range is to be operated to the deceleration-requesting position B2, press-operating the lock releasing button 20c. In the case of the present embodiment, the driver can extremely clearly distinguish the two-stage shift down from the one-stage shift down.

FIG. 11 shows a setting example of the stroke of the shift lever 20 and a load (an operational reaction force) when the shift lever 20 positioned at the M range is operated toward the deceleration-requesting position. It is set as a nonlinear characteristic such that an increase rate of the load is larger when the stroke is large. Thereby, the shift lever 20 can be operated lightly (i.e., with a light operational force) when the shift down with a small number of the shift stage is requested, and the load is heavier quickly when the shift-down stage number is larger. Accordingly, the driver can apparently recognize how many number of the shift stage is requested for the shift down from the load, i.e., the operational reaction force of the shift lever 20.

FIG. 12 shows a modified example of FIG. 11. Setting of FIG. 12 is configured such that the load (operational reaction force) increases stepwise in accordance with an increase of the stroke. In this case, since a change of the load can be extremely clearly recognized, the driver can apparently recognize how many number of the shift stage is requested for the shift down from the load, i.e., the operational reaction force of the shift lever 20.

While the embodiments have been described, the present invention should not be limited to the above-described embodiments and any other modifications or improvements may be applied within the scope of a spirit of the present invention.

(1) The transmission may be a continuously (steplessly) variable transmission or a type of transmission in which both a stepped transmission and a continuously variable transmission are provided and these two are controlled in a coordinated manner. In this case, since the gear ratio of the continuously variable transmission can be continuously variably changed to a low-speed side, the desired deceleration of the vehicle can be continuously obtained easily. Herein, even in the continuously variable transmission, the gear ratio can be changed stepwise to the low-speed side, for example, in a three-step manner or a four or more-step manner.

(2) The generator 7 may be configured to serve as a motor in a drive traveling. The vehicle may be a front-wheel drive vehicle or a four-wheel drive vehicle. Further, the motor may be a drive source. The deceleration changing can be controlled by adding a throttle control of the engine 1.

(3) An operational force or an operational period may be applied as a parameter to represent the operational quantity of the shift lever 20, not limited to the stroke of the shift lever 20. Further, the operational quantity may be determined based on any one or combination of the stroke, the operational force, and the operational period of the shift lever. In particular, the driver can intuitively recognize the operational position of the shift lever (that is, the magnitude of the desired deceleration) by setting the stroke and the operational force which are combined such that the operational force is larger when the stroke is larger.

(4) The detection of the operational force as the operational quantity can be performed by a load sensor which receives a load when the shift lever 20 is operated toward the deceleration-requesting position side. In this case, the stroke of the shift lever 20 operated toward the deceleration-requesting position can be extremely small. Likewise, the detection of the operational period as the operational quantity can be performed by a switch to detect the operation of the shift lever 20 toward the deceleration-requesting position. In this case, the stroke of the shift lever 20 operated toward the deceleration-requesting position can be extremely small.

(5) While the shift up is generally conducted as the one-stage shift up, the number of shift-up stage may be set in accordance with the quantity of the one-time operation of the shift lever 20 similarly to the shift down, like the one-stage shift up, the two-stage shift up, or the three or more-stage shift up.

(6) The shift lever 20 may be configured to be automatically returned to the M range by releasing the operational force after the shift lever 20 is operated toward the deceleration-requesting positions B1-B3 as a momentary type (a self-return type) between the M range and the deceleration-requesting positions B1-B3.

(7) The position detection of the shift lever 20 can be performed by any appropriate means, such as switches which are provided at respective ranges and deceleration-requesting positions. The maximum stage number of the shift down which is allowable at one time may be configured to be two, or four or more. In a case where the maximum number of forward traveling stage is five, for example, the maximum stage number of the shift down can be set at a small number like two, for example. Meanwhile, in a case where the maximum number of forward traveling stage is a large number, such as eight or ten, for example, the maximum stage number of the shift down can be set at 4 or more.

(8) The target deceleration (the deceleration to be achieved) can be compensated by the road surface gradient. That is, the deceleration in a case of a down slope can be compensated so as to be larger than that in a case of a flat surface road, and the deceleration in a case of an uphill rod is compensated so as to be smaller than that in the case in the flat surface road. Further, the deceleration can be compensated in accordance with a relative speed to a preceding vehicle immediately ahead of one's own vehicle. That is, the deceleration can be compensated such that the deceleration becomes large when the relative speed to the preceding vehicle is high, and the deceleration becomes smaller when an approaching relative speed to the preceding vehicle is slow or when a separation relative speed from the preceding vehicle is high. Moreover, the deceleration which is generated by a normal braking operation (by a foot brake) of the driver may be learned, and the deceleration may be compensated such that the deceleration becomes large when this learned deceleration is larger than a standard value (the deceleration becomes small when this learned deceleration is smaller than the standard value).

(9) When the vehicle speed is excessively high (over a speed limit), a control to obtain the larger deceleration may be performed even if the operational quantity of the shift lever 20 toward the deceleration-requesting position is the same.

(10) Respective steps or a step group shown in the flowcharts can be expressed by adding means to names of their functions. Of course, the object of the present invention includes not only the clearly-described ones but implicitly includes providing things expressed as preferable matters or merits.

What is claimed is:

1. A deceleration control device of a vehicle which changes deceleration of the vehicle by changing a drive state of a driving wheel, comprising:

a deceleration changing mechanism to change the deceleration of the vehicle;

a controller to control the deceleration changing mechanism;

a shift lever operable from a specified position to a deceleration-requesting position, the shift lever being configured such that an operable range of the shift lever for changing the deceleration of the vehicle is larger than an operable range for changing acceleration of the vehicle; and an operational-quantity detector to detect an operational quantity of a one-time operation of the shift lever which is operated from the specified position toward the deceleration-requesting position, wherein said controller is configured to control said deceleration changing mechanism such that the deceleration of the vehicle is larger when the operational quantity detected by said operational-quantity detector is larger.

2. The deceleration control device of the vehicle of claim 1, wherein said deceleration changing mechanism is an automatic transmission which changes the drive state of the driving wheel, said controller is configured to control a gear ratio of said automatic transmission, and said gear ratio of the automatic transmission controlled by the controller is shifted down to a low-speed side such that the deceleration of the vehicle is larger when the operational quantity detected by said operational-quantity detector is larger.

3. The deceleration control device of the vehicle of claim 2, wherein said automatic transmission is a stepped automatic transmission having plural shift stages, and said controller is configured to control said automatic transmission such that the number of stage of speed change to shift down by the automatic transmission is more when the operational quantity detected by said operational-quantity detector is larger.

4. The deceleration control device of the vehicle of claim 3, wherein the maximum of said number of stage of speed change to shift down which is controlled by said controller is two.

5. The deceleration control device of the vehicle of claim 3, wherein the maximum of said number of stage of speed change to shift down which is controlled by said controller is three of more.

6. The deceleration control device of the vehicle of claim 1, wherein said deceleration changing mechanism is a generator which is driven by an engine of the vehicle and capable of generating power for regeneration, said controller is configured to control a regenerative power-generation quantity generated by said generator, and said regenerative power-generation quantity of the generator controlled by the controller is increased such that the deceleration of the vehicle is larger when the operational quantity detected by said operational-quantity detector is larger.

7. The deceleration control device of the vehicle of claim 1, wherein said deceleration changing mechanism comprises an automatic transmission which changes the drive state of the driving wheel and a generator which is driven by an engine of the vehicle and capable of generating power for regeneration, said controller is configured to concurrently control a gear ratio of said automatic transmission and a regenerative power-generation quantity generated by said generator, and said gear ratio of the automatic transmission controlled by the controller is shifted down to a low-speed side and said regenerative power-generation quantity of the generator controlled by the controller is increased such that the deceleration of the vehicle is larger when the operational quantity detected by said operational-quantity detector is larger.

8. The deceleration control device of the vehicle of claim 7, further comprising:
a first determiner to determine target deceleration in accordance with the operational quantity detected by said operational-quantity detector; and
a second determiner to determine the number of stage of speed change to shift down controlled by the automatic transmission and the regenerative power-generation quantity generated by the generator such that the target deceleration determined by said first determiner is obtained,
wherein said controller is configured to perform the shift-down control of the automatic transmission by the number of stage of speed change to shift down determined by the second determiner and control the generator so as to generate the regenerative power-generation quantity determined by the second determiner.

9. The deceleration control device of the vehicle of claim 1, further comprising a shift gate for guiding a move of said shift lever,
wherein said shift gate comprises a main gate portion where a parking range, a reverse range, a neutral range, and a drive range are arranged in series from one-end side of the shift gate toward the other-end side of the shift gate in order, a sub gate portion where a manual range and said deceleration-requesting position are arranged in series, and a connecting gate portion which interconnects a drive-range position of said main gate portion and a manual-range position of said sub gate portion, said main gate portion and said sub gate portion are arranged in parallel on right-and-left sides, and said deceleration-requesting position is configured to extend from the manual-range position toward a parking-range position.

10. The deceleration control device of the vehicle of claim 1, wherein when said shift lever is operated toward said deceleration-requesting position, the shift lever is configured to be held at a current position as long as the shift lever is not operationally returned.

11. The deceleration control device of the vehicle of claim 1, wherein said operational quantity detected by the operational-quantity detector includes a stroke of said shift lever.

\* \* \* \* \*